United States Patent
Minamizawa (10) Patent No.: US 12,495,286 B2
(45) Date of Patent: Dec. 9, 2025

(54) NOTIFICATION DEVICE, NOTIFICATION SYSTEM, NOTIFICATION METHOD, AND STORAGE MEDIUM

(71) Applicant: NEC Corporation, Tokyo (JP)

(72) Inventor: Takeaki Minamizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 462 days.

(21) Appl. No.: 18/008,705

(22) PCT Filed: Jun. 4, 2021

(86) PCT No.: PCT/JP2021/021321
§ 371 (c)(1),
(2) Date: Dec. 7, 2022

(87) PCT Pub. No.: WO2021/251285
PCT Pub. Date: Dec. 16, 2021

(65) Prior Publication Data
US 2023/0224687 A1     Jul. 13, 2023

(30) Foreign Application Priority Data

Jun. 9, 2020   (JP) ................................. 2020-099830

(51) Int. Cl.
*H04W 4/00* (2018.01)
*H04W 4/021* (2018.01)
*H04W 4/90* (2018.01)
*H04W 68/00* (2009.01)

(52) U.S. Cl.
CPC ............. *H04W 4/90* (2018.02); *H04W 4/021* (2013.01); *H04W 68/00* (2013.01)

(58) Field of Classification Search
CPC ....... H04W 4/90; H04W 4/021; H04W 68/00; H04W 4/02
See application file for complete search history.

(56) References Cited

U.S. PATENT DOCUMENTS

| | | | | |
|---|---|---|---|---|
| 2010/0009671 A1* | 1/2010 | Goldman | .............. | H04W 24/08 455/423 |
| 2015/0143184 A1* | 5/2015 | Suzuki | .................... | H04L 45/22 714/48 |

FOREIGN PATENT DOCUMENTS

| | | |
|---|---|---|
| JP | 2001-186254 A | 7/2001 |
| JP | 2003-186980 A | 7/2003 |
| JP | 2014-181959 A | 9/2014 |

(Continued)

OTHER PUBLICATIONS

International Search Report for PCT Application No. PCT/JP2021/021321, mailed on Aug. 24, 2021.

(Continued)

*Primary Examiner* — Omoniyi Obayanju
(74) *Attorney, Agent, or Firm* — Sughrue Mion, PLLC (57) ABSTRACT

In order to suppress any increase in the load of a server that accepts safety information, this notification device comprises an acquisition means for acquiring an occurrence timing at which a disaster occurs, a specification means for specifying a terminal at which abandoned calls occurred at and after the occurrence timing, and a transmission means for transmitting a notification that indicates that the acceptance means has begun to accept safety information to the specified terminal earlier than to other terminals among a plurality of terminals.

9 Claims, 6 Drawing Sheets

(56) References Cited

FOREIGN PATENT DOCUMENTS

| | | |
|---|---|---|
| JP | 2017-017666 A | 1/2017 |
| JP | 2019-200460 A | 11/2019 |

OTHER PUBLICATIONS

English translation of Written opinion for PCT Application No. PCT/JP2021/021321, mailed on Aug. 24, 2021.

\* cited by examiner

Fig. 2

ABANDONED-CALL INFORMATION DB 71

| TIME | CALLER | CALLING DESTINATION |
|---|---|---|
| 13:00 | TELEPHONE NUMBER A | TELEPHONE NUMBER E |
| 13:01 | TELEPHONE NUMBER B | TELEPHONE NUMBER F |
| 13:06 | TELEPHONE NUMBER C | TELEPHONE NUMBER G |
| 13:09 | TELEPHONE NUMBER D | TELEPHONE NUMBER H |

Fig. 3

SUBSCRIBER INFORMATION DB 72

| PHONE NUMBER | POSITION |
|---|---|
| PHONE NUMBER A | REGION B |
| PHONE NUMBER B | REGION C |
| PHONE NUMBER C | REGION A |
| PHONE NUMBER D | REGION A |
| PHONE NUMBER E | REGION B |
| PHONE NUMBER F | REGION C |
| PHONE NUMBER G | REGION C |
| PHONE NUMBER H | REGION B |

NOTIFICATION DEVICE, NOTIFICATION SYSTEM, NOTIFICATION METHOD, AND STORAGE MEDIUM

This application is a National Stage Entry of PCT/JP2021/021321 filed on Jun. 4, 2021, which claims priority from Japanese Patent Application 2020-099830 filed on Jun. 9, 2020, the contents of all of which are incorporated herein by reference, in their entirety.

TECHNICAL FIELD

The present invention relates to a notification device, a notification system, a notification method, and a storage medium that are able to suppress an increase in load of a server that receives safety information.

BACKGROUND ART

A disaster massage service enables a user to register, in a server, own safety information in association with identification information (for example, a phone number of the user) when a disaster such as an earthquake and a typhoon occurs. Each user of the disaster message service is allowed to confirm safety information relating to another user by performing retrieval in the server by using identification information. PTL 1 discloses a system that distributes information required in an event of a disaster.

The server of the disaster message service starts to receive registration of safety information from a user after a disaster occurs. At this time, the server outputs a notification to a communication terminal of a user in order to notify the user that reception of safety information registration is started. Then, the user who receives the notification registers own safety information in the server.

CITATION LIST

Patent Literature

[PTL 1] Japanese Unexamined Patent Application Publication No. 2014-181959

SUMMARY OF INVENTION

Technical Problem

However, when the server outputs notifications to a large number of users, the large number of users register safety information in the server in response to the notifications. In this case, a large amount of safety information is registered in the server at the same time, which causes a problem of an increase in load of the server.

The present invention has been made in view of the above-mentioned problem, and an object of the present invention is to provide a notification device, a notification system, a notification method, and a storage medium that are able to suppress an increase in load of a server that receives safety information.

Solution to Problem

A notification device according to the present invention includes an acquisition means for acquiring an occurrence timing of a disaster, a specification means for specifying a terminal that generates an abandoned call after the occurrence timing, and a transmission means for transmitting a notification to the terminal being specified among a plurality of terminals prior to another terminal, the notification indicating that a reception means starts reception of safety information.

Further, a notification device according to the present invention includes the above-mentioned notification device and the reception means capable of receiving safety information.

Further, a notification method according to the present invention includes acquiring an occurrence timing of a disaster, specifying a terminal that generates an abandoned call after the occurrence timing, and transmitting a notification to the terminal being specified among a plurality of terminals prior to another terminal, the notification indicating that reception of safety information is started.

Further, a storage medium according to the present invention stores a program causing an information processing device to execute processing of acquiring an occurrence timing of a disaster, processing of specifying a terminal that generates an abandoned call after the occurrence timing, and processing of transmitting a notification to the terminal being specified among a plurality of terminals prior to another terminal, the notification indicating that reception of safety information is started.

Advantageous Effects of Invention

According to the present invention, it is possible to provide a notification device, a notification system, a notification method, and a storage medium that are able to suppress an increase in load of a server that receives safety information.

EXAMPLE EMBODIMENT

First Example Embodiment

Figure 1:
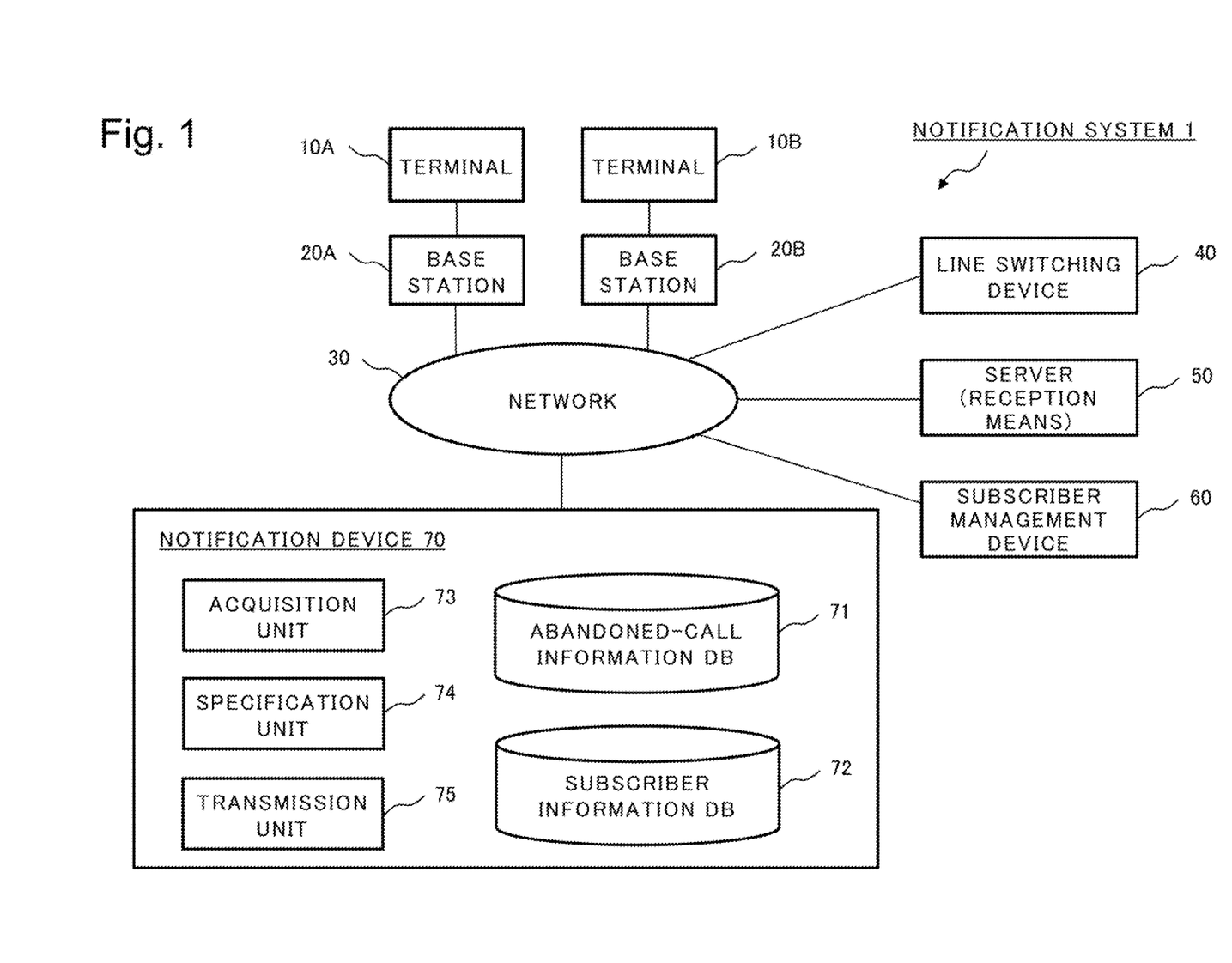
FIG. 1 is a block diagram illustrating a configuration example of a notification system according to a first example embodiment of the present invention.
Figure 2:
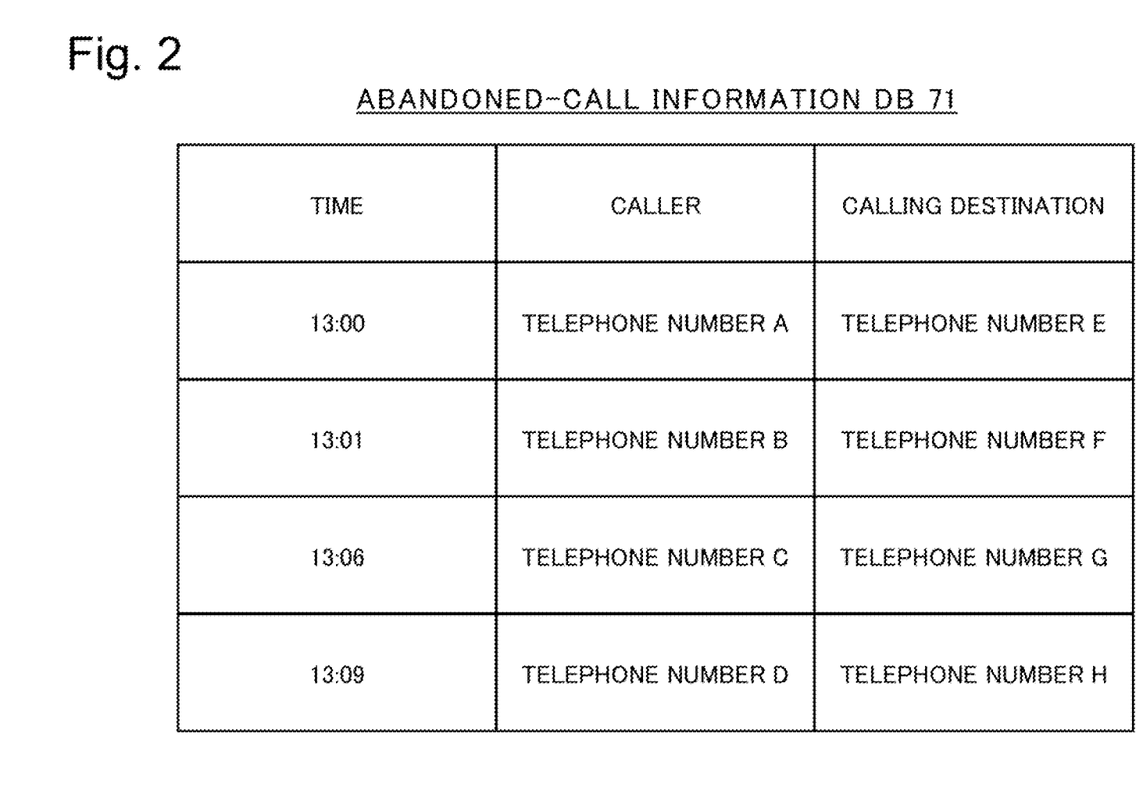
FIG. 2 is a diagram for describing the notification system according to the first example embodiment of the present invention.
Figure 3:
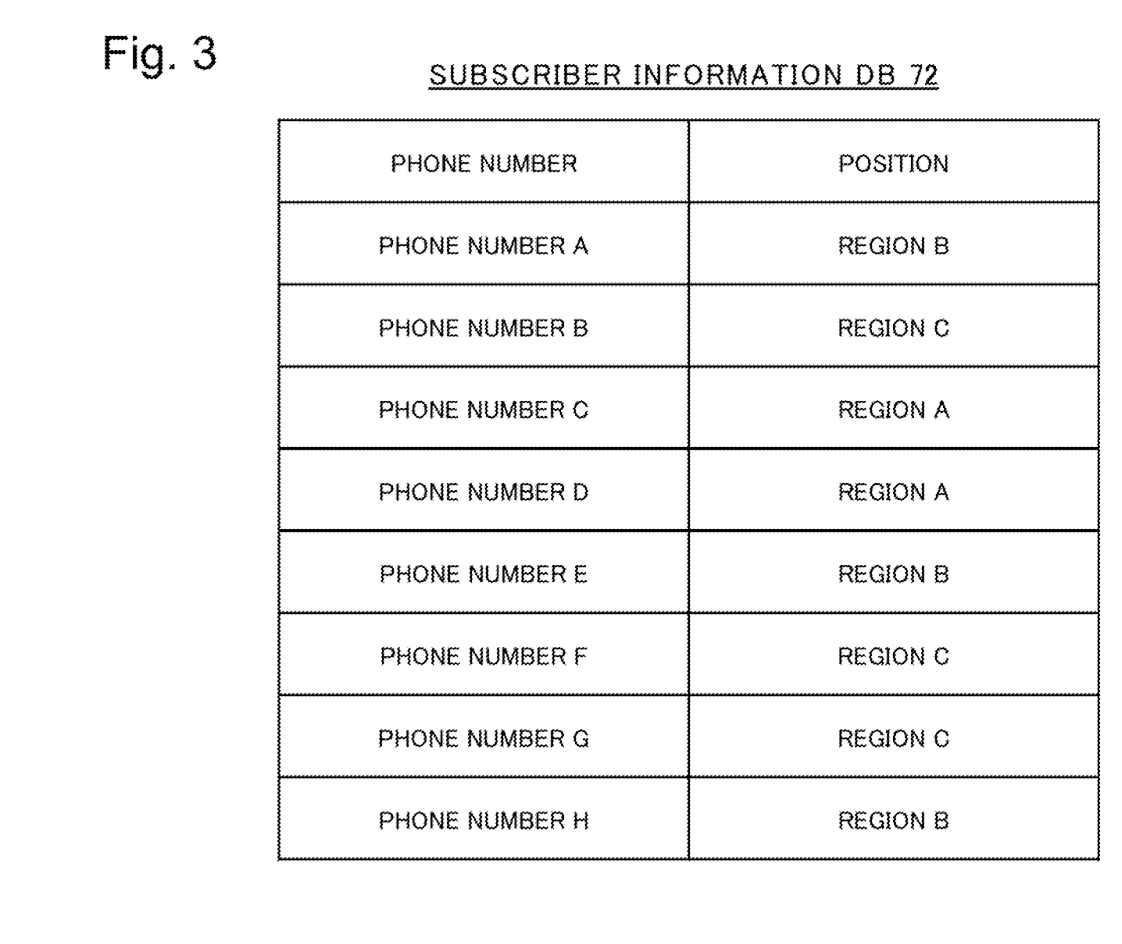
FIG. 3 is a diagram for describing the notification system according to the first example embodiment of the present invention.
Figure 4:
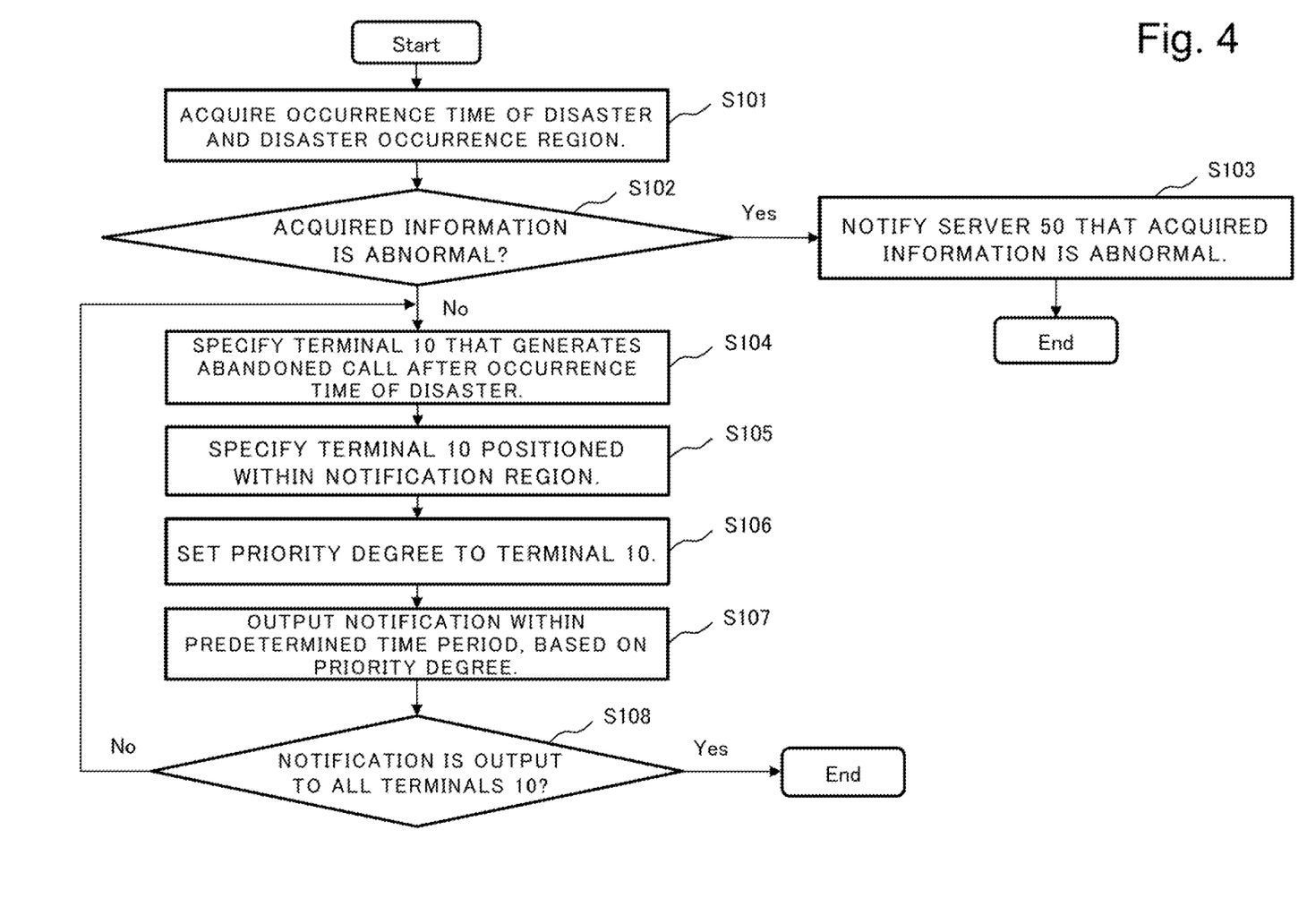
FIG. 4 is a flowchart illustrating an operation example of the notification system according to the first example embodiment of the present invention.

A notification system 1 according to a first example embodiment is described with reference to FIG. 1, FIG. 2, FIG. 3, and FIG. 4. FIG. 1 is a block diagram illustrating a configuration example of the notification system 1. FIG. 2 is a diagram for describing an abandoned-call information DB 71 described later. Further, FIG. 3 is a diagram for describing subscriber information DB described later. Further, FIG. 4 is a flowchart illustrating an operation example of the notification system 1.

The configuration of the notification system 1 is described. As described in FIG. 1, the notification system 1 includes terminals 10A and 10B, base stations 20A and 20B, a network 30, a line switching device 40, a server 50, a subscriber management device 60, and a notification device 70.

Note that, in the following description, when there is no need to distinguish the terminals 10A and 10B from each other, each of the terminals 10A and 10B is referred to as a terminal 10. Further, when there is no need to distinguish the base stations 20A and 20B from each other, each of the base stations 20A and 20B is referred to as a base station 20.

The terminal 10 is described. The terminal 10 can be connected to another terminal 10, the line switching device 40, the server 50, the subscriber management device 60, and the notification device 70 via the base station 20 and the network 30.

The terminal 10 is connected to the another terminal 10, and thus is capable of communicating with the another terminal. Further, a user of the terminal 10 connects the terminal 10 to the server 50, and thus can register own safety information in the server 50. At this state, identification information relating to the terminal 10 is also registered together with the safety information relating to the user in the server 50. The identification information described herein refers to, for example, a phone number of the terminal 10 or an identifier unique to the terminal 10, such as International Mobile Subscriber Identity (IMSI) associated with the phone number of the terminal 10.

Further, when a disaster occurs, the terminal 10 is notified from the notification device 70 that the server 50 starts reception of safety information. The content of this notification is sent to the user with display on a display screen of the terminal 10 or output of a voice sound via a speaker of the terminal 10. For example, the terminal 10 is a smartphone or a mobile phone.

The base station 20 is described. The base station 20 is a general base station that relays communication of the terminal 10. The base station 20 stores own position information (for example, longitude and latitude) in advance. When the base station 20 relays communication from the terminal 10, the own position information is superimposed with a signal output from the terminal 10. Not only in a case of relaying a phone call but also in a case of relaying general data communication, the base station 20 superimposes the own position information. With this, a device that communicates with the terminal 10 can acquire the position information relating to the base station 20 whenever communication with the terminal 10 is performed.

The network 30 is a network that enables communication among the base station 20, the line switching device 40, the server 50, the subscriber management device 60, and the notification device 70.

The line switching device 40 controls a communication path between the terminal 10 being a caller and the terminal 10 being a calling destination. With this, a phone call between the terminals 10 is achieved. The line switching device 40 supports a Call Session Control Function (CSCF) of IP Multimedia Subsystem (IMS) being an architecture framework formulated by the standards institution 3GPP.

A specific example of an abandoned call is described based on an operation example of the line switching device 40. The abandoned call indicates an event in which, although the terminal 10 being a caller requests a phone call with the terminal 10 being a calling destination, the phone call is not established. In this example, it is assumed that the terminal 10A is a terminal being a caller and the terminal 10B is a terminal being a calling destination. The terminal 10A transmits, to the line switching device 40, an outgoing message for requesting a phone call with the terminal 10B. The line switching device 40 transfers the outgoing message to the terminal 10B. The terminal 10B that receives the outgoing message transmits a response message to the line switching device 40 when a phone call is established with the terminal 10A. Then, the line switching device 40 transfers the response message to the terminal 10A. After that, the terminal 10A and the terminal 10 start a phone call. In this case, the terminal 10A and the terminal 10B are not regarded as a terminal that generates an abandoned call.

In contrast, when a phone call is not established with the terminal 10A, the terminal 10B that receives the outgoing message does not transmit a response message to the line switching device 40. When a response message is not received for a predetermined time period, the line switching device 40 determines that the terminal 10B has abandoned the call from the terminal 10A to the terminal 10B. Further, when a message indicating cancellation of the phone call request is received from the terminal 10A, the line switching device 40 determines that the terminal 10A has abandoned the call from the terminal 10A to the terminal 10B. When it is determined that the terminal 10A or the terminal 10B has abandoned the call, the line switching device 40 detects generation of the abandoned call. Subsequently, when the abandoned call is detected, the line switching device 40 stores identification information relating to each of the terminal 10A being a caller of the abandoned call and the terminal 10B being a calling destination of the abandoned call. Further, the line switching device 40 stores a time at which the call is determined to be abandoned, as a time at which the abandoned call is generated. In this case, the terminal 10A and the terminal 10B are regarded as the terminals 10 that generates the abandoned call.

As described above, the terminal 10 that generates the abandoned call indicates a terminal that abandons a call after an outgoing message is received. Whenever an abandoned call is generated, the line switching device 40 outputs, to the abandoned-call information DB 71 described later, the identification information relating to the terminals 10 being a caller and a calling destination and the time at which the abandoned call is generated. The identification information relating to the terminals 10 being a caller and a calling destination is contained in the outgoing message, for example.

The server 50 is a server that starts reception of safety information relating to a user from terminal information when a disaster occurs. The server 50 stores the received safety information in association with the identification information relating to the terminal 10. A user of a service for an event of a disaster performs retrieval in the server 50 by using identification information, and thus can confirm safety information relating to a user of the terminal 10 that owns the identification information. The server 50 is an example of a reception means capable of receiving safety information.

The server 50 acquires a time at which a disaster occurs and a region in which a disaster occurs from an external system (for example, a Web site of Meteorological Agency). Further, the server 50 transmits the acquired time and region to the notification device 70.

The subscriber management device 60 communicates with the terminal 10 in a constant cycle, and thus can acquire the position information relating to the base station 20 in each cycle. The subscriber management device 60 acquires the acquired position information relating to the base station 20, as position information relating to the terminal 10. In this manner, the subscriber management device 60 can acquire the position information relating to the terminal 10 in a predetermined cycle. The subscriber management device 60 supports Home Subscriber Service (HSS) in IMS.

The notification device 70 includes an abandoned-call information DB 71, a subscriber information DB 72, an acquisition unit 73, a specification unit 74, and a transmission unit 75. Note that the acquisition unit 73, the specification unit 74, and the transmission unit 75 are associated with an acquisition means, a specification means, and a transmission means.

The abandoned-call information DB 71 stores the identification information relating to the terminal 10 that generates the abandoned call. The identification information relating to both the terminals 10 being a caller and a calling destination and the time at which the abandoned call is generated are output from the line switching device 40, and are recorded in the abandoned-call information DB 71. Through communication with the line switching device 40, the abandoned-call information DB 71 acquires the identification information relating to the terminals 10 being a caller and a calling destination and the time at which the abandoned call is generated.

With reference to FIG. 2, the abandoned-call information DB 71 is described. FIG. 2 is a diagram illustrating an example of information stored in the abandoned-call information DB 71. In FIG. 2, a phone number is used as the identification information relating to the terminal 10. For example, FIG. 2 illustrates that, although the terminal 10 having a phone number A and the terminal 10 having a phone number E are connected to each other at 13:00, a phone call is not started and the call is abandoned.

In the subscriber information DB 72, the terminal 10 of a user who subscribes to the service for an event of a disaster is registered. Specifically, the subscriber information DB 72 stores the identification information relating to the terminal 10 of the user in association with the position information relating to the terminal 10. The subscriber information DB 72 communicates with the subscriber management device 60 in a predetermined cycle, and thus can acquire the position information relating to the terminal 10 in each cycle.

With reference to FIG. 3, the subscriber information DB 72 is described. FIG. 3 is a diagram illustrating an example of information stored in the subscriber information DB 72. In FIG. 3, a phone number is used as the identification information. For example, FIG. 3 illustrates that the terminals 10 having phone numbers C and D are present in a region B.

The acquisition unit 73 acquires, from the server 50, an occurrence time of a disaster and an occurrence region of a disaster. Here, the occurrence time of the disaster is also referred to as an occurrence timing of a disaster. In other words, the acquisition unit 73 acquires the occurrence timing of the disaster.

The specification unit 74 specifies the terminal 10 that generates the abandoned call after the occurrence timing of the disaster. Specifically, the specification unit 74 refers to the abandoned-call information data base (DB) 71, and thus specifies a terminal that generates an abandoned call after the occurrence timing, among the terminals 10.

Further, the specification unit 74 specifies a notification region associated with the occurrence region of the disaster. For example, the notification region is similar to the occurrence region of the disaster. Further, the notification region may include both the occurrence region of the disaster and a region adjacent to the occurrence region of the disaster.

The specification unit 74 specifies the terminal 10 whose position information registered in the subscriber information DB 72 indicates a position within the notification region.

For example, it is assumed that the acquisition unit 73 acquires 13:05 as the occurrence timing of the disaster and acquires regions A and B as the occurrence regions of the disaster. In this case, the specification unit 74 specifies the regions A and B as the notification regions. Further, from the abandoned-call information DB 71 illustrated in FIG. 2, the specification unit 74 specifies the terminals 10 having phone numbers C, D, G, and H that generate abandoned calls after 13:05, as the terminals 10 that generate the abandoned calls. Further, based on the subscriber information DB illustrated in FIG. 3, the specification unit 74 specifies the terminals 10 having phone numbers A, C, D, and H whose position information matches with the notification region.

The specification unit 74 sets priority degrees to the specified terminals 10. Specifically, the specification unit 74 sets a higher priority degree to the terminal 10 that generates an abandoned call as compared to a terminal that does not generate an abandoned call. Further, the specification unit 74 sets a higher priority degree to the terminal 10 being a caller as compared to the terminal 10 being a calling destination among the terminals 10 that generate the abandoned calls.

In other words, the specification unit 74 sets a first priority degree to the terminal 10 that is positioned within the notification region, dispatches a call after the occurrence timing of the disaster, and fails to establish the call. Further, the specification unit 74 sets a second priority degree to the terminal 10 that is positioned within the notification region, receives a call after the occurrence timing of the disaster, and fails to establish the call. Further, the specification unit 74 sets a third priority degree to the terminal 10 that is positioned within the notification region and does not generate an abandoned call after the occurrence timing of the disaster.

Note that the specification unit 74 may set the first priority degree to the terminal 10 that is positioned within the notification region, receives a call after the occurrence timing of the disaster, and fails to establish the call. In this case, the specification unit 74 sets the second priority degree to the terminal 10 that is positioned within the notification region, dispatches a call after the occurrence timing of the disaster, and fails to establish the call.

In accordance with the priority degrees, the transmission unit 75 transmits, to the terminals 10, a notification indicating that the server 50 starts reception of safety information. Specifically, the transmission unit 75 transmits the notification in the order of the terminal 10 to which the first priority degree is set, the terminal 10 to which the second priority degree is set, and the terminal 10 to which the third priority degree is set.

The configuration of the notification system 1 is as described above. Next, with reference to FIG. 4, an operation example of the notification system 1 is described. Note that, it is assumed that a disaster has already occurred at a starting point of the operation example of the notification system 1. Further, it is assumed that the abandoned-call information DB 71 acquires the information illustrated in FIG. 2 from the line switching device 40. Further, it is assumed that the subscriber information DB 72 acquires the information illustrated in FIG. 3 from the subscriber management device 60.

First, the acquisition unit 73 acquires the occurrence time of the disaster and the occurrence region of the disaster from the server 50 (S101). In this operation example, the acquisition unit 73 acquires 13:05 as the occurrence time of the disaster, and acquires the regions A and B as the occurrence regions of the disaster.

The acquisition unit 73 determines whether the acquired information is abnormal (S102). For example, the acquisition unit 73 determines whether the acquired information is abnormal when the occurrence time of the disaster indicates a time later than the current time. When the acquired information is abnormal (Yes in S102), the transmission unit 75 notifies the server 50 that the information is abnormal, and terminates the operation (S103).

When the acquired information is not abnormal (No in S102), the specification unit 74 specifies the terminal 10 that generates the abandoned call after the occurrence time of the disaster (S104). In this operation example, the specification unit 74 extracts, from the abandoned-call information DB 71, information relating to abandoned calls generated after 13:05, and thus specifies the terminals 10 having the phone numbers C, D, G, and H as the terminals 10 that generate the abandoned calls.

The specification unit 74 specifies the terminal 10 positioned within the notification region (S105). In this operation example, the specification unit 74 specifies the regions A and B being occurrence regions of the disaster as the notification regions. With this, the specification unit 74 specifies, from the subscriber information DB 72, the terminals 10 having the phone numbers A, C, D, E, and H.

The specification unit 74 sets priority degrees to the specified terminals 10 (S106). Specifically, the specification unit 74 sets the first priority degree to the terminal 10 that is positioned within the notification region, dispatches a call after the occurrence timing of the disaster, and fails to establish the call. Further, the specification unit 74 sets the second priority degree to the terminal 10 that is positioned within the notification region, receives a call after the occurrence timing of the disaster, and fails to establish the call. Further, the specification unit 74 sets the third priority degree to the terminal 10 that is positioned within the notification region and does not generate an abandoned call after the occurrence timing of the disaster.

In this operation example, the specification unit 74 sets the first priority degree to the terminals 10 having the phone numbers C and D (S106). Further, the specification unit 74 sets the second priority degree to the terminal 10 having the phone number H. Further, the specification unit 74 sets the third priority degree to the terminals 10 having the phone numbers A and E.

The transmission unit 75 outputs a notification within a predetermined time period, based on the set priority degrees (S107). In this example, the transmission unit 75 transmits the notification for 60 seconds in the order of the terminals 10 having the phone numbers C and D, the terminal 10 having the phone number H, and the terminals 10 having the phone numbers A and E.

The transmission unit 75 determines whether the notification is transmitted to all the terminals 10 to which the priority degrees are set (S108). When the notification is transmitted to all the terminals 10 to which the priority degrees are set (Yes in S108), the notification system 1 terminates the operation.

When the notification is transmitted to all the terminals 10 to which the priority degrees are set (Yes in S108), the processing in S104 is executed again. In this operation example, it is assumed that the notification is transmitted to the terminals 10 having the phone numbers C and D but the notification is not output to the terminals having the phone numbers of A, E, and H. In this case, the processing from S104 to S108 is executed again. At this state, during the processing in S105, the specification unit 74 specifies the terminal 10 again that is positioned within the disaster occurrence region. Further, during the processing in S106, a priority degree is not set to the terminals 10 having the phone numbers C and D to which the notification has already been transmitted.

The operation of the notification system 1 is as described above.

Note that, in the description of the notification system 1, it is described that the subscriber management device 60 acquires the position information relating to the base station as the position information relating to the terminal 10, but the subscriber management device 60 may regard other position information as the position information relating to the terminal 10. For example, the subscriber management device 60 may acquire position information relating to the line switching device 40 or own position information relating to the subscriber management device 60 as the position information relating to the terminal 10.

Note that, in the description of the notification system 1, the processing in S104 and S105 may be executed at the same time.

Note that, in the description of the notification system 1, the abandoned-call information DB 71 stores the abandoned call generated by the terminal 10, but is not required to store an abandoned call equal to or shorter than a predetermined calling time period. With this, it is possible to exclude the terminal 10 that performs a one-ring call or dispatches a call to a non-existing phone number, from the notification destinations.

As described above, the notification system 1 includes the reception means (the server 50 in the description given above), the acquisition unit 73, the specification unit 74, and the transmission unit 75. The reception means (the server 50) is capable of receiving safety information. The acquisition unit 73 acquires the occurrence timing of the disaster. The specification unit 74 specifies the terminal 10 that generates the abandoned call after the occurrence timing of the disaster. The transmission unit 75 transmits a notification to the specified terminal 10 among the plurality of terminals 10 prior to the other terminals 10, the notification indicating that the reception means starts reception of safety information.

In general, the user of the terminal 10 starts registration of safety information in the reception means after receiving the notification. In the notification system 1, the notification is first output to the terminal 10 that generates the abandoned call among the plurality of terminals 10, and a user of the terminal 10 that generates the abandoned call starts registration of safety information prior to users of the other terminals 10. With this, the notification system 1 can suppress an increase in load of the server for receiving safety information. Further, in some cases, the terminal 10 that generates the abandoned call is owned by a user who fails to send own safety information to the others. In the notification system 1, the notification is first output to the terminal 10 that generates the abandoned call among the plurality of terminals 10, and hence the notification is transmitted preferentially to such a user.

Further, the reception means (the server 50) receives the safety information from the terminal 10 in association with the identification information relating to the terminal 10. With this, a subscriber of the service for an event of a disaster performs retrieval in the reception means by using the identification information relating to the terminal 10, and thus can confirm safety information relating to a desired user.

Further, the acquisition unit 73 further acquires the occurrence region of the disaster. The specification unit 74 specifies the terminal 10 that is present at a position associated with the occurrence region of the disaster. The transmission unit 75 transmits a notification to the terminal that is present at the position at which the disaster occurs, among the plurality of terminals 10 that are registered in advance. With this, the notification system 1 can notify a user who is in the disaster occurrence region or near the disaster occurrence region that the reception means starts reception of registration of safety information.

Further, the specification unit 74 compares the position information relating to the base station 20 to which the terminal 10 is connected and the position associated with the occurrence region of the disaster, and thus specifies the terminal 10 that is present in a region associated with the occurrence region of the disaster. The base station 20 to which the terminal 10 is connected is switched along with movement of a user who owns the terminal 10. Thus, in the notification system 1, even when a user moves, it can be determined whether the terminal 10 is present in a region associated with the occurrence region of the disaster, based on the position of the user after moving.

Further, the transmission unit 75 transmits the notification to the terminal 10 during the predetermined time period. After the transmission unit 75 transmits the notification, the specification unit 74 specifies the terminal 10 again that is present at a position associated with the occurrence region of the disaster. In this manner, in the notification system 1, before and after the notification is transmitted to the terminal 10, the specification unit 74 specifies the terminal 10 at least twice that is present at a position associated with the occurrence region of the disaster. With this, even when a user who owns the terminal 10 moves during transmission of the notification, it can be determined whether the terminal 10 is present at a position associated with the occurrence region of the disaster, based on the position after moving.

Further, the specification unit 74 sets the first priority degree to the terminal 10 that is present at a position at which the disaster occurs, and is a caller of an abandoned call generated after the occurrence timing of the disaster. Further, the specification unit 74 sets the second priority degree to the terminal 10 that is present at a position at which the disaster occurs, and is a calling destination of an abandoned call generated after the occurrence timing of the disaster. Further, the specification unit 74 sets the third priority degree to the terminal 10 that is present at a position at which the disaster occurs, and does not generate an abandoned call after the occurrence timing at which the disaster occurs. Further, the transmission unit 75 transmits the notification in the order of the terminal 10 to which the first priority degree is set, the terminal 10 to which the second priority degree is set, and the terminal 10 to which the third priority degree is set.

With this, the notification system 1 can transmit the notification to the terminal 10 that generates the abandoned call prior to the terminal 10 that does not generate the abandoned call. With this, a user who cannot provide own safety information or acquire safety information relating to another person due to a failure of a phone call after the disaster occurs, can be preferentially notified that reception of registration of safety information is started. Further, the notification system 1 can output the notification to the terminal 10 being caller prior to the terminal 10 being a calling destination among the terminals 10 that generate the abandoned calls. With this, a user, which cannot provide own safety information after the disaster occurs, can be preferentially notified that reception of registration of safety information is started.

The notification system 1 is as described above.

Second Example Embodiment

Figure 5:
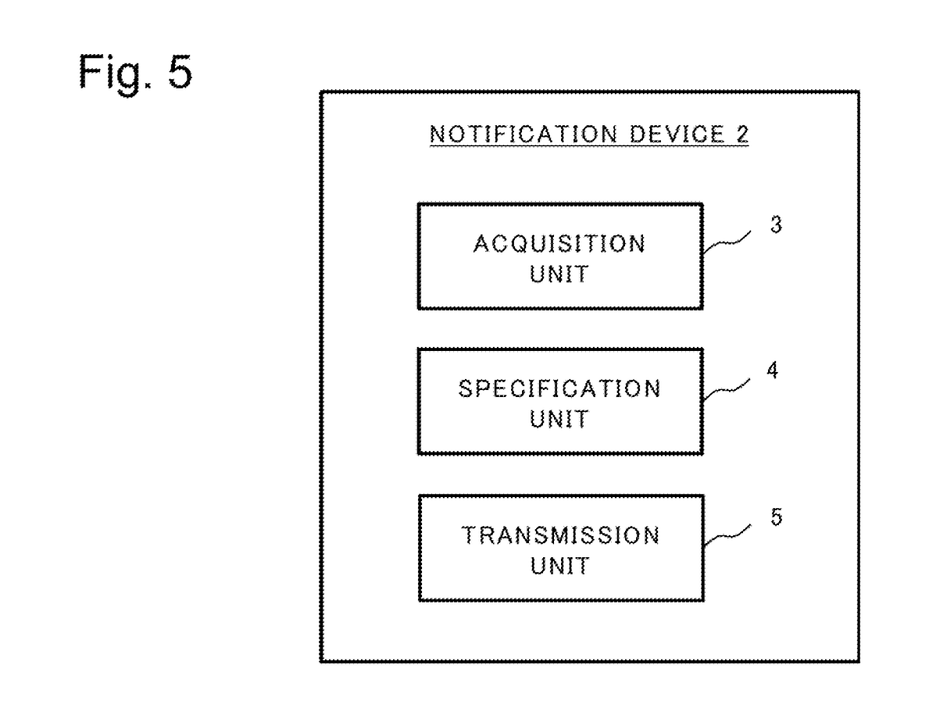
FIG. 5 is a block diagram illustrating a configuration example of a notification device according to a second example embodiment of the present invention.

A notification device 2 according to a second example embodiment is described with reference to FIG. 5 and FIG. 6. As illustrated in FIG. 5, the notification device 2 includes an acquisition unit 3, a specification unit 4, and a transmission unit 5.

The acquisition unit 3 acquires the occurrence timing of the disaster. The specification unit 4 specifies the terminal 10 (not illustrated) that generates the abandoned call after the occurrence timing. The transmission unit 5 transmits a notification to the specified terminal 10 among the plurality of terminals registered in advance prior to the other terminals, the notification indicating the reception means (not illustrated) that is capable of receiving safety information starts reception of safety information.

Note that the acquisition unit 3, the specification unit 4, and the transmission unit 5 may include part or an entirety of the functions of the acquisition unit 73, the specification unit 74, and the transmission unit 75, respectively, that are included in the notification system 1 according to the first example embodiment. The configuration of the notification device 2 is as described above.

Figure 6:
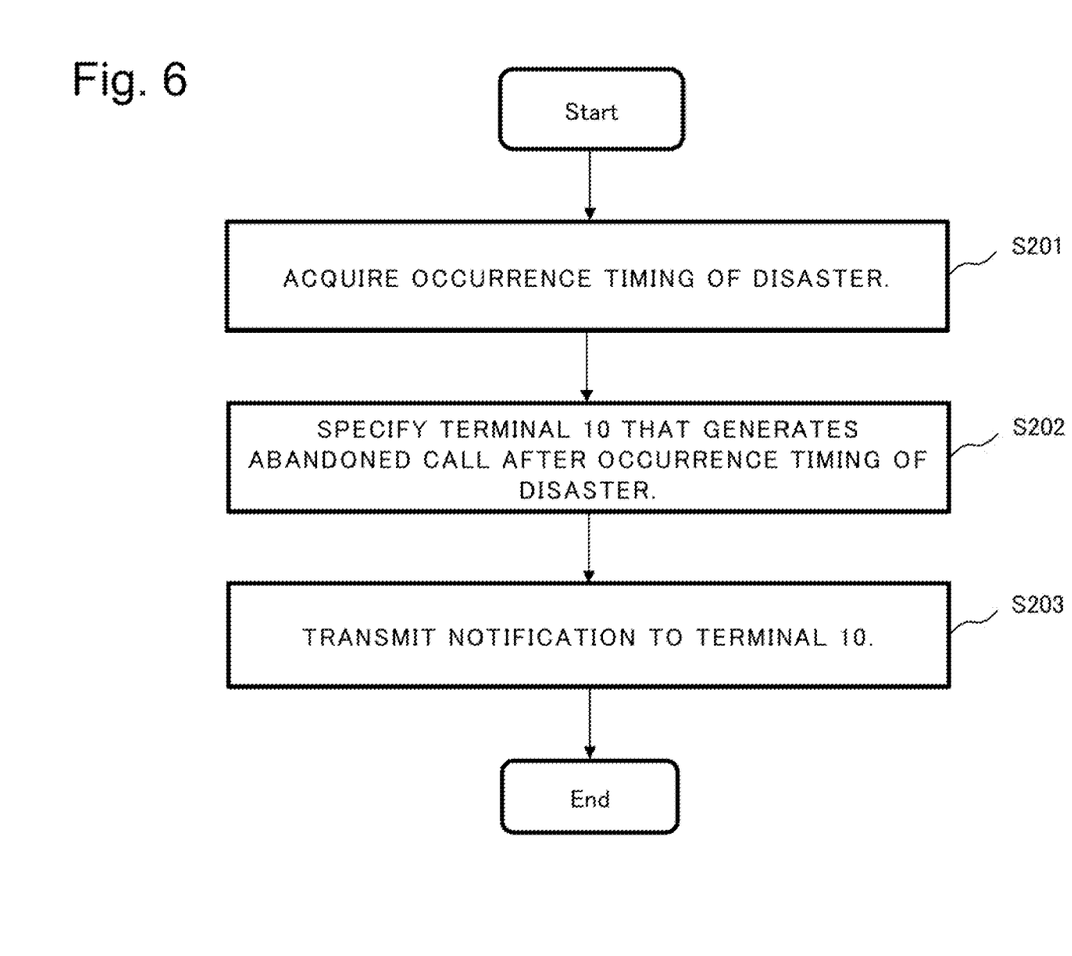
FIG. 6 is a flowchart illustrating an operation example of the notification device according to the second example embodiment of the present invention.

Next, with reference to FIG. 6, an operation example (notification method) of the notification device 2 is described. FIG. 6 is a flowchart illustrating an operation of the notification device 2. Note that a program for causing an information processing device to execute the processing from S201 to S202 given below may be stored in a storage medium.

First, the acquisition unit 3 acquires the occurrence timing of the disaster (S201). The acquisition unit 3 acquires the occurrence timing of the disaster from, for example, a Web site of Meteorological Agency.

The specification unit 4 specifies the terminal 10 that generates the abandoned call after the occurrence timing of the disaster (S202). For example, the specification unit 4 specifies the terminal 10 that generates the abandoned call by referring to history of connection between the terminals 10, which is stored in the line switching device (not illustrated).

The transmission unit 5 transmits the notification to the terminal 10. Specifically, the transmission unit 5 transmits the notification to the terminal specified in S202 among the plurality of terminals registered in advance prior to the other terminals. The notification indicates that the reception means (not illustrated) that is capable of receiving safety information starts reception of safety information.

As described above, the notification device 2 includes the acquisition unit 3, the specification unit 4, and the transmission unit 5. The acquisition unit 3 acquires the occurrence timing of the disaster. The specification unit 4 specifies the terminal 10 that generates the abandoned call after the occurrence timing of the disaster. The transmission unit 5 transmits a notification to the specified terminal 10 among the plurality of terminals 10 prior to the other terminals 10, the notification indicating that the reception means starts reception of safety information.

In general, the user of the terminal 10 starts registration of safety information in the reception means after receiving the notification. With the notification device 2, the notification is first output to the terminal 10 that generates the abandoned call among the plurality of terminals 10, and a user of the terminal 10 that generates the abandoned call starts registration of safety information prior to users of the other terminals 10. With this, the notification device 2 can suppress an increase in load of the server for receiving safety information. Further, in some cases, the terminal 10 that generates the abandoned call is owned by a user who fails to send own safety information to the others. With the notification device 2, the notification is first output to the terminal 10 that generates the abandoned call among the plurality of terminals 10, and hence the notification is transmitted preferentially to such a user.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-099830, filed on Jun. 9, 2020, the disclosure of which is incorporated herein in its entirety by reference.

REFERENCE SIGNS LIST

1 Notification system
2, 70 Notification device
3, 73 Acquisition unit
4, 74 Specification unit
5, 75 Transmission unit
10, 10A, 10B Terminal
20, 20A, 20B Base station
30 Network
40 Line switching device
50 Server
60 Subscriber management device
71 Abandoned-call information DB
72 Subscriber information DB

What is claimed is:

1. A notification device comprising:
at least one memory that is configured to store instructions; and
at least one processor that is configured to execute the instructions to:
acquire an occurrence timing of a disaster;
specify a terminal that generates an abandoned call after the occurrence timing; and
a transmitter configured to transmit a notification to the terminal being specified among a plurality of terminals prior to another terminal, the notification indicating that a receptor starts reception of safety information.

2. The notification device according to claim 1, wherein the receptor receives safety information from the terminal in association with identification information relating to the terminal.

3. The notification device according to claim 1, wherein the at least one processor further executes the instructions to:
acquire an occurrence region of the disaster; and
specify a terminal that is present in a notification region associated with the occurrence region of the disaster, and
the transmitter transmits the notification to the terminal that is present in the notification region among a plurality of terminals registered in advance.

4. The notification device according to claim 3, wherein the at least one processor further executes the instructions to:
specify the terminal that is present in the notification region, by comparing position information relating to a base station to which the terminal is connected, with the notification region.

5. The notification device according to claim 3, wherein the transmitter transmits the notification to the terminal during a predetermined period, and
the at least one processor further executes the instructions to specify the terminal that is present in the notification region again after the transmitter transmits the notification.

6. The notification device according to claim 3, wherein the at least one processor further executes the instructions to:
transmit the notification in an order of:
the terminal being present in the notification region and being a caller of an abandoned call generated after the occurrence timing;
the terminal being present in the notification region and being a calling destination of an abandoned call generated after the occurrence timing; and
the terminal being present in the notification region without generation of an abandoned call after the occurrence timing.

7. A notification system comprising:
the notification device according to claim 1; and
the receptor configured to receive registration of safety information.

8. A notification method comprising:
acquiring an occurrence timing of a disaster;
specifying a terminal that generates an abandoned call after the occurrence timing; and
transmitting a notification to the terminal being specified among a plurality of terminals prior to another terminal, the notification indicating that reception of safety information is started.

9. A non-transitory storage medium that stores a program causing an information processing device to execute:
processing of acquiring an occurrence timing of a disaster;
processing of specifying a terminal that generates an abandoned call after the occurrence timing; and
processing of transmitting a notification to the terminal being specified among a plurality of terminals prior to another terminal, the notification indicating that reception of safety information is started.

* * * * *